United States Patent
Stuhaug et al.

(10) Patent No.: US 11,770,846 B2
(45) Date of Patent: Sep. 26, 2023

(54) OPERATING METHOD OF A COMMUNICATION NODE IN A WIRELESS COMMUNICATION NETWORK, ASSOCIATED COMMUNICATION NODE, COMMUNICATION SYSTEM AND STORAGE SYSTEM

(71) Applicant: Autostore Technology AS, Nedre Vats (NO)

(72) Inventors: Ragnar Stuhaug, Skjold (NO); Ingvar Hognaland, Nedre Vats (NO)

(73) Assignee: Autostore Technology AS, Nedre Vats (NO)

( * ) Notice: Subject to any disclaimer, the term of this patent is extended or adjusted under 35 U.S.C. 154(b) by 0 days.

(21) Appl. No.: 16/314,064

(22) PCT Filed: Jun. 28, 2017

(86) PCT No.: PCT/EP2017/066001
§ 371 (c)(1),
(2) Date: Dec. 28, 2018

(87) PCT Pub. No.: WO2018/002143
PCT Pub. Date: Jan. 4, 2018

(65) Prior Publication Data
US 2019/0239237 A1    Aug. 1, 2019

(30) Foreign Application Priority Data
Jun. 30, 2016  (NO) .................................. 20161087

(51) Int. Cl.
*H04W 72/542*  (2023.01)
*H04W 74/08*  (2009.01)
(Continued)

(52) U.S. Cl.
CPC ........ *H04W 72/542* (2023.01); *B65G 1/0464* (2013.01); *H04L 7/0008* (2013.01);
(Continued)

(58) Field of Classification Search
None
See application file for complete search history.

(56) References Cited

U.S. PATENT DOCUMENTS 6,052,594 A    4/2000  Chuang et al.
6,748,221 B1 *  6/2004  Peltola .................. H04W 48/18
455/450

(Continued)

FOREIGN PATENT DOCUMENTS

CN    101523767 A    9/2009
CN    104126319 A    10/2014
(Continued)

OTHER PUBLICATIONS

International Search Report issued in Application No. PCT/EP2017/066001, dated Sep. 25, 2017 (6 pages).
(Continued)

*Primary Examiner* — Srinivasa R Reddivalam
(74) *Attorney, Agent, or Firm* — Osha Bergman Watanabe & Burton LLP

(57) ABSTRACT

An operating method of a communication node in a wireless communication network, wherein the node communicates with a central communication unit via at least one access point, has been disclosed. The operating method comprises:
  receiving, at the node, a wireless signal from the access point;
  determining, by the node, channel quality information based on the received wireless signal;
  determining, by the node, an order of active channels ranked according to the determined channel quality; and
(Continued)

selecting, by the node, an active channel for transmitting wireless signals in accordance with the determined order, and transmitting, by the node, wireless signals on the selected, active channel.

A communication node which implements the method, and a communication system and a storage system with includes the communication node, have also been disclosed.

14 Claims, 9 Drawing Sheets

(51) Int. Cl.

| | |
|---|---|
| *B65G 1/04* | (2006.01) |
| *H04W 72/563* | (2023.01) |
| *H04L 7/00* | (2006.01) |
| *H04W 40/24* | (2009.01) |
| *H04W 48/16* | (2009.01) |
| *H04W 48/18* | (2009.01) |
| *H04W 72/0446* | (2023.01) |

(52) U.S. Cl.
CPC ......... *H04W 40/244* (2013.01); *H04W 48/16* (2013.01); *H04W 48/18* (2013.01); *H04W 72/0446* (2013.01); *H04W 72/563* (2023.01); *H04W 74/0816* (2013.01)

(56) References Cited

U.S. PATENT DOCUMENTS

| | | |
|---|---|---|
| 2004/0039817 A1 | 2/2004 | Lee et al. |
| 2007/0076663 A1* | 4/2007 | Qi .................... H04W 36/18 370/331 |
| 2010/0124238 A1 | 5/2010 | Hong et al. |
| 2011/0096739 A1* | 4/2011 | Heidari ............. H04W 72/085 370/329 |
| 2011/0194407 A1* | 8/2011 | Ji ....................... H04B 7/2606 370/315 |
| 2013/0242783 A1 | 9/2013 | Horn et al. |
| 2014/0086081 A1* | 3/2014 | Mack .................. H04L 5/001 370/252 |
| 2014/0355576 A1* | 12/2014 | Wang ............... H04W 72/1263 370/336 |
| 2015/0127733 A1 | 5/2015 | Ding et al. |
| 2015/0201452 A1* | 7/2015 | Wang .................... H04W 8/005 455/426.1 |
| 2015/0282032 A1* | 10/2015 | Gupta ............... H04W 72/0453 370/329 |
| 2016/0192301 A1* | 6/2016 | Sampath ............... H04W 56/00 370/338 |
| 2016/0309469 A1* | 10/2016 | Shu .................... H04W 74/0816 |
| 2016/0330707 A1* | 11/2016 | Das ....................... H04L 67/535 |
| 2017/0251426 A1* | 8/2017 | Yadav ................... H04W 48/18 |
| 2018/0148259 A1* | 5/2018 | Gravelle .............. B65G 1/0464 |
| 2021/0014649 A1* | 1/2021 | Maeda ............. H04W 72/0446 |

FOREIGN PATENT DOCUMENTS

| | | |
|---|---|---|
| CN | 104662987 A | 5/2015 |
| CN | 104685917 A | 6/2015 |
| EP | 2187551 A1 | 5/2010 |
| EP | 2214447 A2 | 8/2010 |
| EP | 2717644 A1 | 4/2014 |
| JP | 2010506512 A | 2/2010 |
| WO | 08043048 A1 | 4/2008 |
| WO | 2012/051157 A1 | 4/2012 |
| WO | 2015104263 A2 | 7/2015 |
| WO | 2015105813 A2 | 7/2015 |

OTHER PUBLICATIONS

Written Opinion issued in International Application No. PCT/EP2017/066001, dated Sep. 25, 2017 (8 pages).
International Preliminary Report on Patentability issued in Application No. PCT/EP2017/066001, dated May 28, 2018 (33 pages).
Search Report issued in Norwegian U.S. Appl. No. 20/161,087, dated Jan. 17, 2017 (2 pages).
Ragnar Stuhaug; "Implementation, Test, and Verification of a Specialized Real-Time Radio Protocol Chip: AtMega128RFA1, Application: Autostore;" Jul. 1, 2013; XP055407639; https://brage.bibsys.no/xmlui/bitstream/handle/11250/2400660/9999_FULLTEXT.pdf?sequence=1&isAllowed=y (150 pages).
European Office Action issued in the counterpart European Patent Application No. 17734059.3, dated Jan. 30, 2020 (5 pages).
Office Action issued in the counterpart European Patent Application No. 17734059.3, dated Mar. 11, 2021 (7 pages).
Office Action issued in Japanese Application No. 2018-568954; dated Jan. 28, 2022 (14 pages).
Office Action issued in Chinese Application No. 2017800368477 dated Oct. 8, 2022 (16 pages).

* cited by examiner

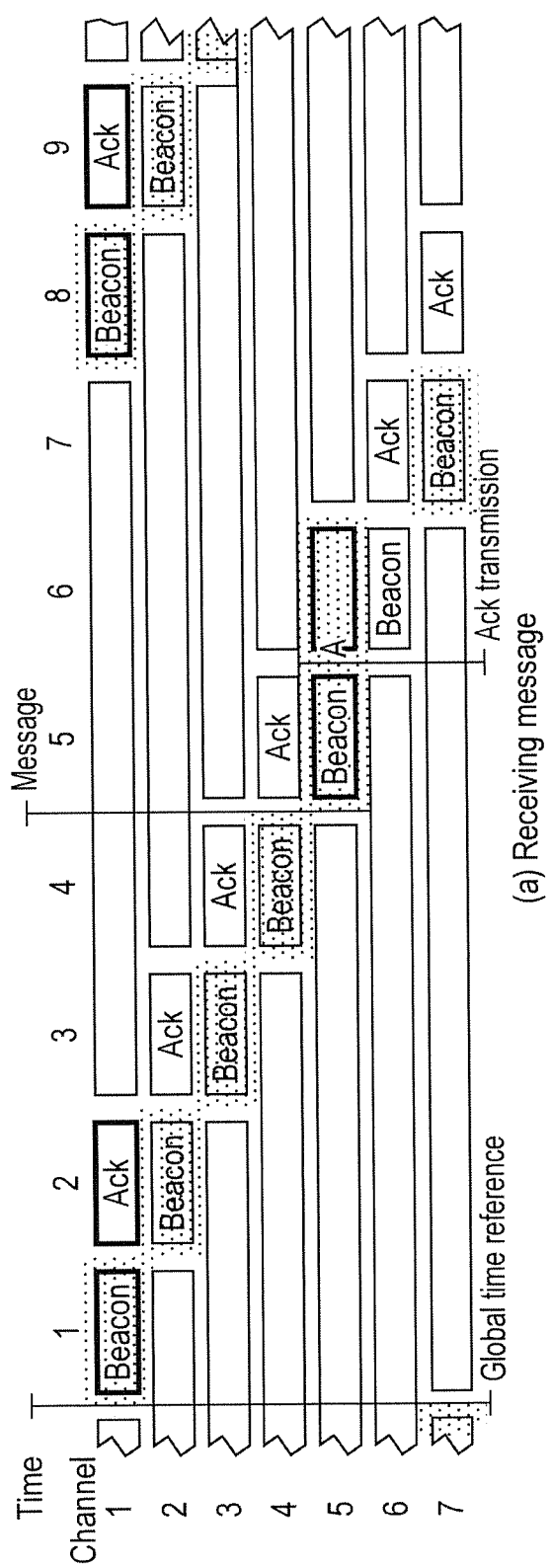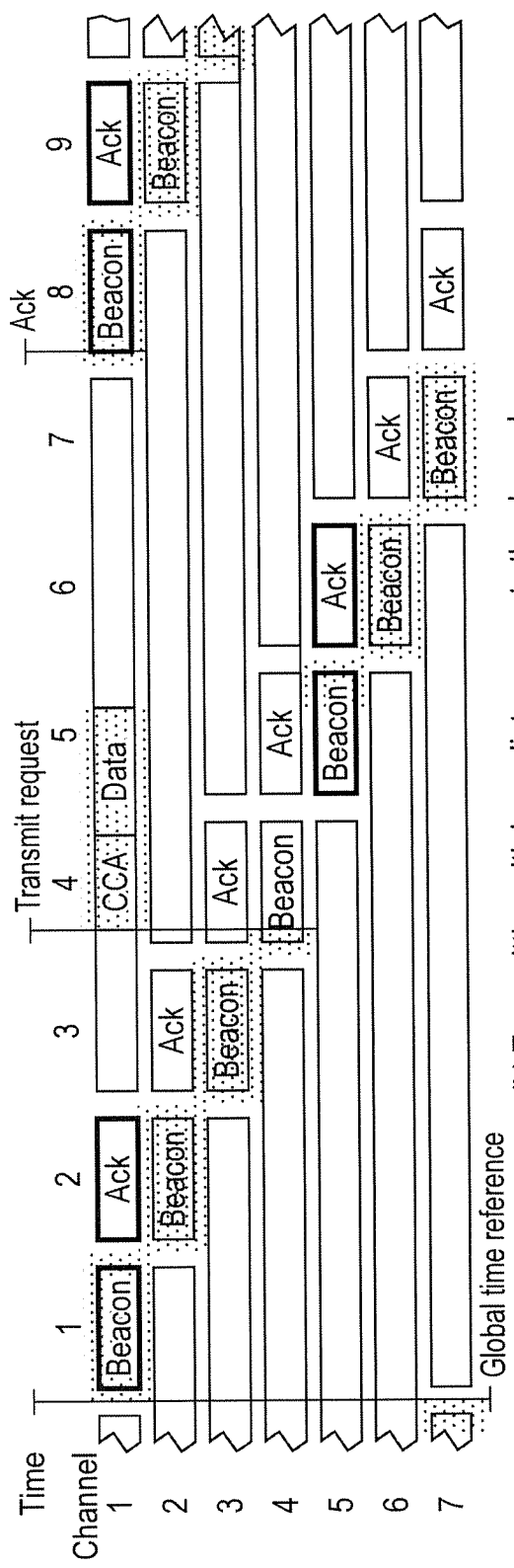
FIG. 8

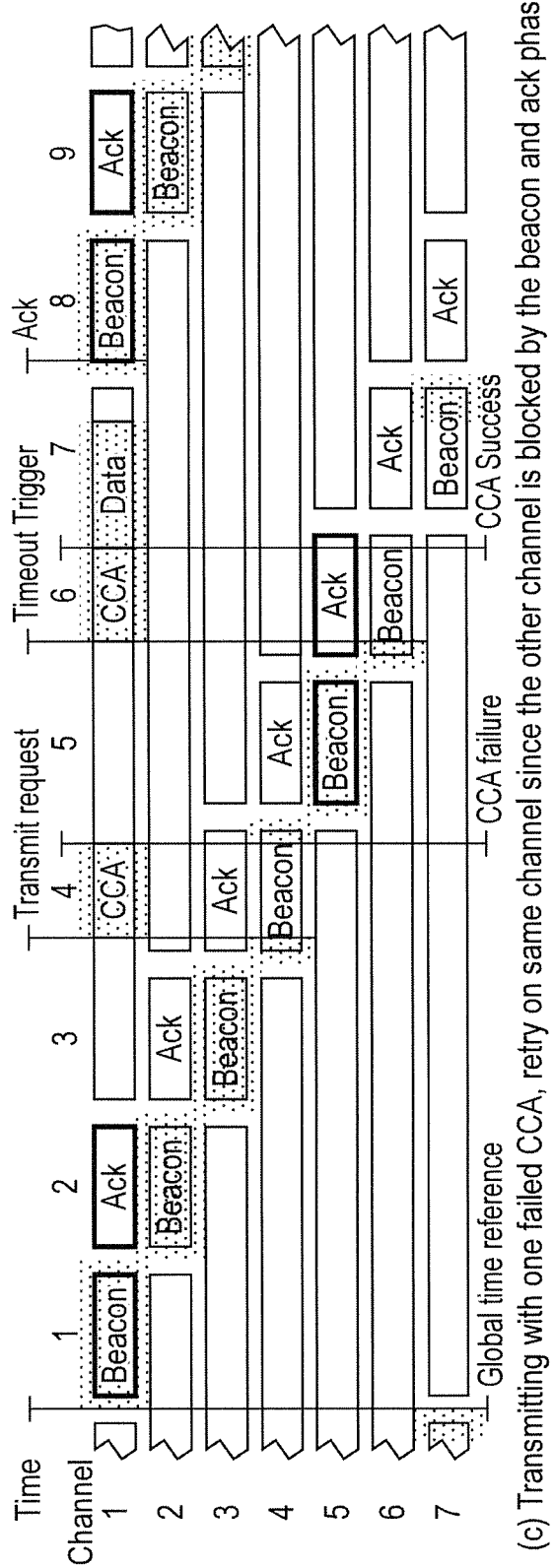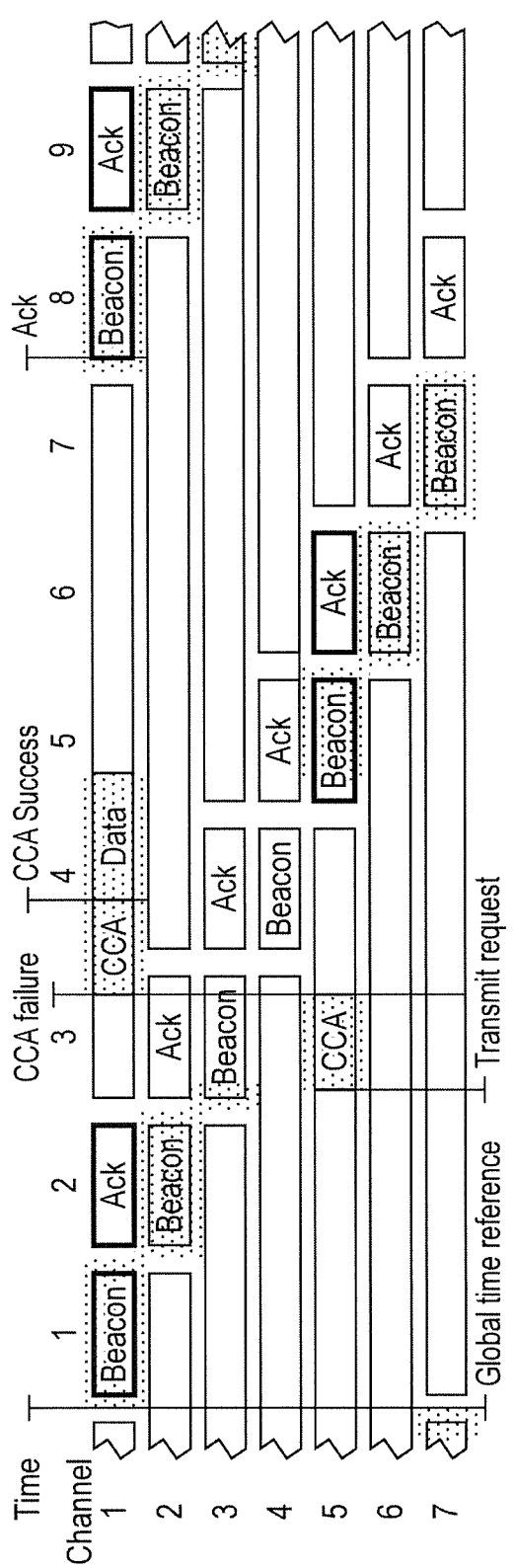
FIG. 8 (Continued)

US 11,770,846 B2

OPERATING METHOD OF A COMMUNICATION NODE IN A WIRELESS COMMUNICATION NETWORK, ASSOCIATED COMMUNICATION NODE, COMMUNICATION SYSTEM AND STORAGE SYSTEM

CROSS REFERENCE TO RELATED APPLICATIONS

This application is the national phase application of PCT Application No. PCT/EP2017/066001, filed on Jun. 28, 2017, which claims priority to Norwegian Patent Application No. 20161087, filed on Jun. 30, 2016.

TECHNICAL FIELD

The present invention relates to wireless communication technology.

More specifically, the invention relates to an operating method of a communication node in a wireless communication network, wherein the node communicates with a central communication unit via at least one access point; and to a communication node operating in such a wireless communication network.

The invention also relates to a wireless communication system and a storage system, wherein such communication nodes are included.

BACKGROUND

A storage system which comprises a three-dimensional storage grid that contains a plurality of bins stacked in vertical stacks is known as AutoStore. Supporting rails are arranged on the grid structure, and a plurality of vehicles are arranged to move along the rails on the grid structure.

The vehicles are remotely controlled to pick up bins from the vertical stacks, move the bins to desired positions and bring them to vertical ports and further to an operator, when requested by a central unit.

In order to enable the operation of such a storage system, a wireless communication network is provided. Each vehicle is provided with a communication node, which communicates with the central unit via a number of communication access points, which may be positioned at fixed locations throughout the system.

Providing such communication nodes, their operation method, and the entire communication system, gives rise to several challenges.

For instance, the system should be versatile in terms of physical layout and scale. The number of vehicles (with associated communication nodes) in use should be flexible. The grid may take various shapes, determined by physical properties of the premises in which the storage system is installed. Hence, the vehicles must be provided with communication nodes that should be able to handle a wide range of different physical topologies.

The wireless communication system should be able to communicate with all vehicles at all times, even if it is impossible to have line of sight to all positions on the grid. There may be numerous obstacles like pillars and walls obstructing the signals. Such obstacles may also introduce reflections that the wireless communication system should be able to handle.

The communication system should advantageously be able to operate reliably even in the presence of interfering background radio signals, e.g. Wi-Fi communication.

The communication system should further advantageously provide a failsafe emergency stop functionality.

Also, general requirements of communication rate, timing and throughput requirements should be fulfilled.

Other possible requirements and/or desired properties include:

No need for node-to-node communication;
No need for multi-hop routing;
Short response time is required;
Updated data is more essential than complete data, i.e, loss of a message may be more preferred than a large delay;
The amount of data transmitted by the nodes is much larger than the amount of data received by the nodes;
The central unit should not act as a network manager;
The nodes should be able to switch quickly between access points;
The data load may vary substantially by time;
A fixed allocated capacity of nodes is not desired.

Various standardized and other previously known communication protocols exist, which may fulfil some of the above requirements and desired properties.

However, due to shortcomings and drawbacks of existing communication protocols, there is a need for providing an improved operating method of a communication node in a wireless communication network, an improved communication node, an improved communication system and an improved storage system.

US-2014/086081 A1 describes a communication system comprising nodes, a central communication unit and an access point, wherein channel quality is determined and used to provide an ordered channel list. An active communication channel is selected in accordance with the ordered list. The provision of the ordered channel list and the selection of active channel in accordance with the ordered list are performed by a Channel Management Function which is included in a central Dynamic Spectrum Management engine. The Channel Management Function and the Dynamic Spectrum Management engine are provided as central elements in the communication system.

U.S. Pat. No. 6,052,594 relates to a method and system for controlling media access in which a paging message is transmitted from a base station to a wireless station when a data packet is received for downlink transmission to the wireless station. The base station is one of a plurality of base stations and the wireless station is associated with the base station. In response to the paging message, a level of each of a plurality of pilot frequency signals is detected at the wireless station. Each pilot frequency corresponds to a downlink traffic channel and is transmitted by base stations to which the downlink traffic channel is assigned. The wireless station generates a list of preferred traffic channels based on a priority order of traffic channels and on detected levels of the pilot frequency signals, and transmits the list to the associated base station. A downlink traffic channel is assigned for downlink transmitting the received data packet to the wireless station based on the list of preferred traffic channels and updates a channel priority order list at the base station.

SUMMARY

The invention has been defined by the appended independent claims. Advantageous embodiments have been defined by the dependent claims.

Hence, in an aspect of the invention, an operating method of a communication node in a wireless communication network has been provided. In the method, the node communicates with a central communication unit via at least one access point, and the method comprises:

receiving, at the node, a wireless signal from the access point;

determining, by the node, channel quality information based on the received wireless signal;

determining, by the node, an order of active channels ranked according to the determined channel quality; and selecting, by the node, an active channel for transmitting wireless signals in accordance with the determined order, and transmitting, by the node, wireless signals on the selected, active channel.

In another aspect, a communication node operating in a wireless communication network, the network comprising the node, a central communication unit and at least one access point, has been provided. The node is configured to:

receiving a wireless signal from the access point;

determining channel quality information based on the received wireless signal;

determining an order of active channels ranked according to the determined channel quality; and selecting an active channel for transmitting wireless signals in accordance with the determined order, and transmitting, by the node, wireless signals on the selected, active channel.

A wireless communication system, comprising a central communication unit, at least one access point and at least one communication node as disclosed herein, has also been provided by the invention.

Finally, the invention relates to a storage system, comprising a three-dimensional storage grid containing a plurality of bins stacked in vertical stacks; supporting rails on the grid structure; and a plurality of vehicles, arranged to move along the rails on the grid structure; each vehicle being configured to communicate with a central communication unit via at least one access point, each vehicle comprising a communication node as disclosed herein.

BRIEF DESCRIPTION OF THE DRAWINGS

Various aspects and features of the invention will be described in conjunction with the appended drawings, provided as illustrative examples and not to limit the invention to the disclosed aspects and features.

FIG. 8 includes four schematic timing diagrams, illustrating various aspects of communication sequences.

DETAILED DESCRIPTION

Figure 1:
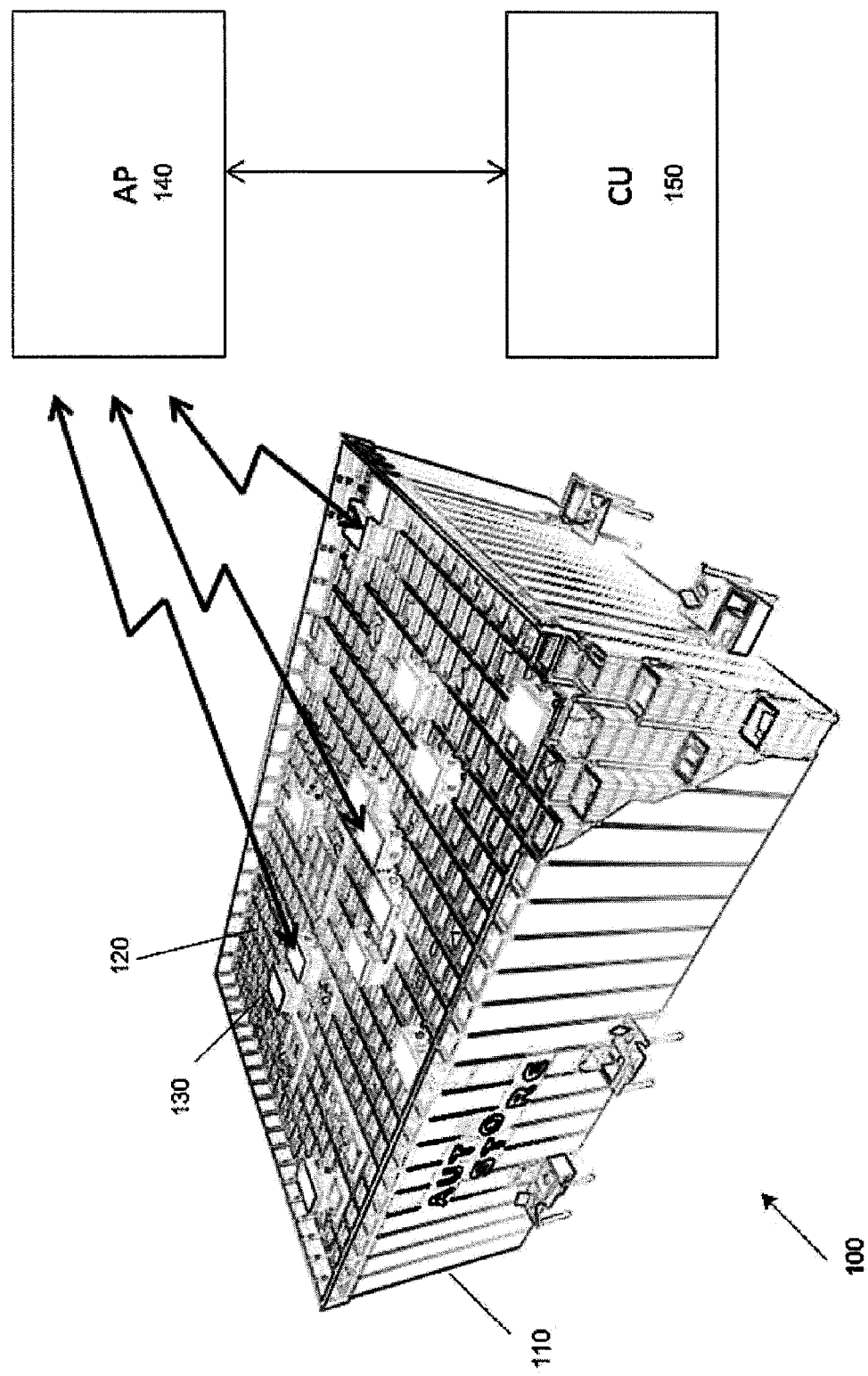
FIG. 1 is a schematic diagram illustrating principles of a storage system.

FIG. 1 is a schematic diagram illustrating principles of a storage system 100.

The storage system 100 comprises a three-dimensional storage grid structure 110 that contains a plurality of bins stacked in vertical stacks. Supporting rails 120 are arranged in a two-dimensional manner on the top of the grid structure 110, and a plurality of vehicles 130 are arranged to move along the rails that are arranged on top of the grid structure 110.

The vehicles 130 are remotely controlled to pick up bins from the vertical stacks, move the bins to desired positions on the top of the grid structure 110, and to bring them to vertical lifts and/or ports and further to an operator, when requested by a central unit 150.

In order to enable the operation of such a storage system 100, a wireless communication network is provided. Each vehicle 130 is provided with a communication node (not shown in FIG. 1), which communicates with the central unit 150 via a number of communication access points 140 (only one shown for simplicity), which may be positioned at fixed locations throughout the system 100.

Figure 2:
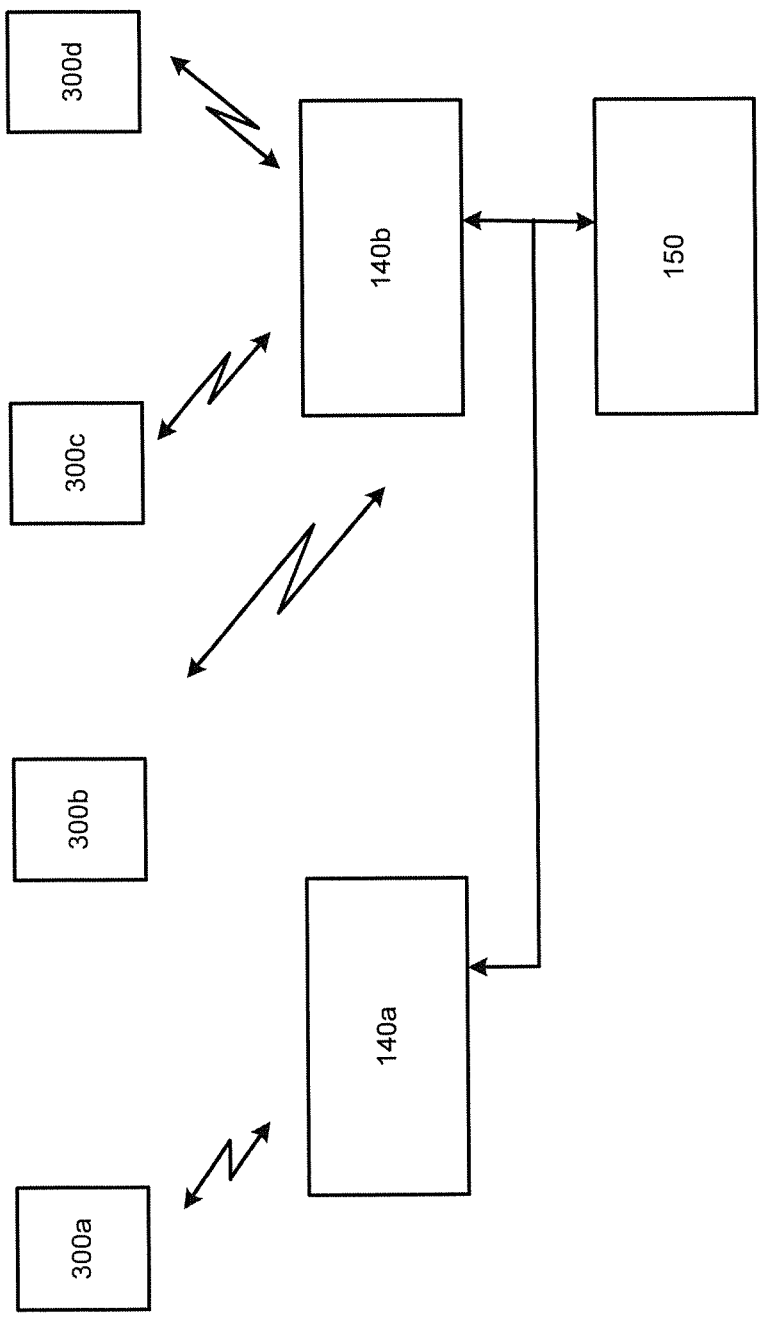
FIG. 2 is a schematic block diagram illustrating principles of a communication system.

FIG. 2 is a schematic block diagram illustrating principles of a communication system.

In FIG. 2, four communication nodes 300a, 300b, 300c, 300d are shown. Each node is intended to be included in a vehicle (such as the vehicle 130 shown in FIG. 1) in the storage system 100. It should be understood that any suitable number of communication nodes may be provided in the communication system, such as any number between 1 and 250. In some cases more than 250 communication nodes may be used. Some nodes may serve other purposes than being a communication node for a vehicle in the storage system.

Each node 300a, 300b, 300c, 300d is configured to communicate with the central unit 150 via an access point 140a, 140b. As illustrated, the access point 140a provides wireless communication with the node 300a, while the access point 140b provides wireless communication with the nodes 300b, 300c, and 300d. The wireless communication is preferably a radio communication. It should be understood that any suitable number of access points may be provided in the communication system, such as any number between 1 and 10. In some cases more than 10 access points may be used. It should be understood that the association between communicating nodes and access points may vary dynamically during operation of the communication system and the storage system 100.

The communication between the access point 140a, 140b and the central unit 150 may in some cases be wired, e.g. by an electrical or optical connection. In other aspects the communication between the access point 140a, 140b and the central unit 150 may be wireless, e.g by radio.

Figure 3:
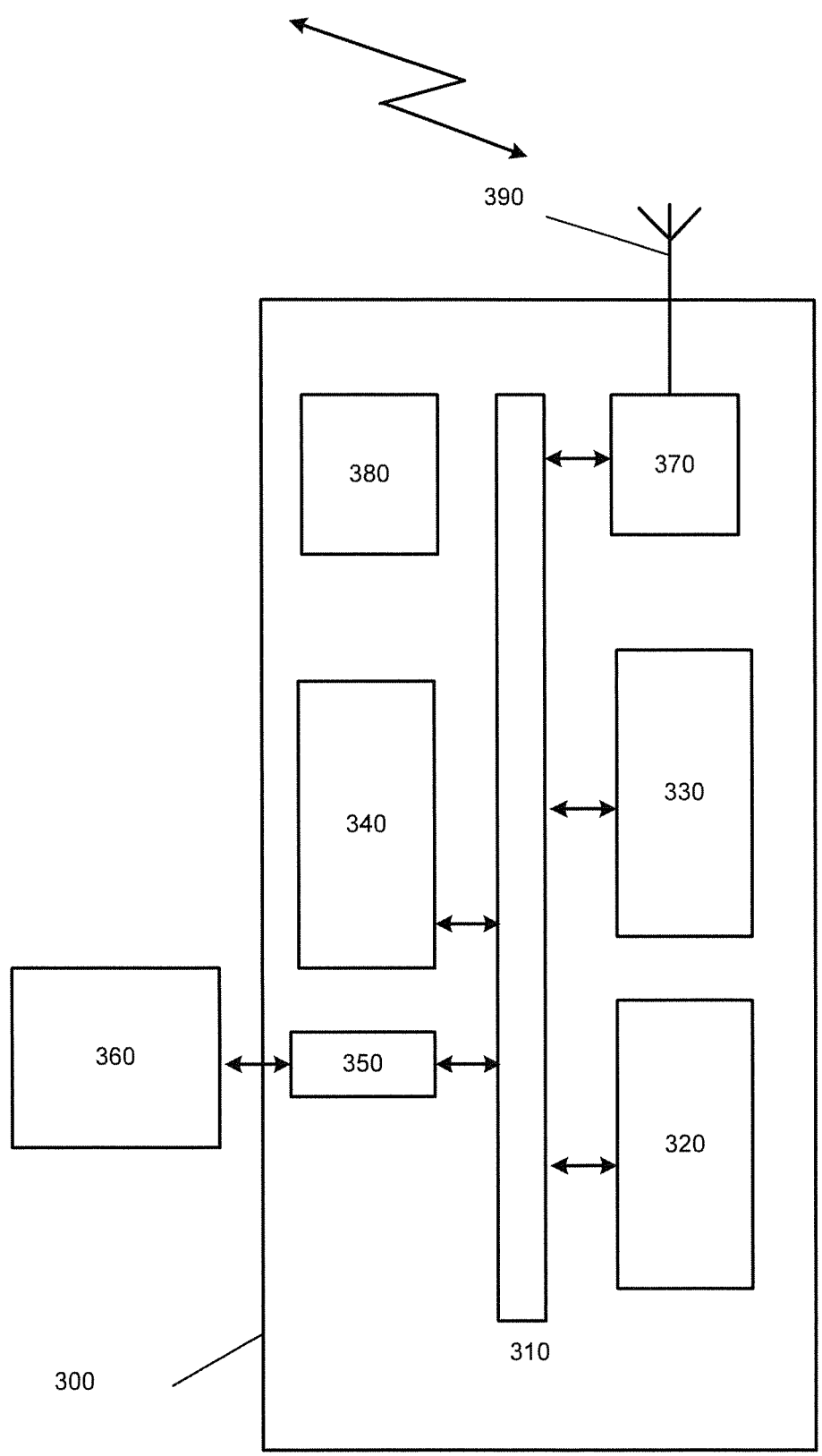
FIG. 3 is a schematic block diagram illustrating principles of a communication node.

FIG. 3 is a schematic block diagram illustrating principles of a communication node.

The communication node 300 may include an internal bus 310, which, i.a., interconnects a processing device 340 such as a microprocessor, a non-volatile memory 320 such as ROM or Flash memory, and a volatile memory 330 such as a RAM. The non-volatile memory 320 may contain a set of processing instructions in the form of a computer program, which, when executed by the processing device 340, causes the communication node 300 to perform a method as specified in the present disclosure. The volatile memory 330 may contain variable data used by the processing device during the execution of the processing instructions. A wireless communication device 370 is also interconnected to the bus 310, which provides two-way radio communication between an external access point (not shown in FIG. 2) and the communication node 300 by means of a connected antenna 390. An I/O device 350 is also interconnected to the bus 310, which provides data communication between the communication node 300 and an external control device 360, which e.g. may include control circuits arranged to control movement of the vehicle in which the communication node 300 is arranged. The external control device 360 may also include sensors, transducers etc. which provides signals associated with the operation of the vehicle, which should be communicated by the communication node 300 to the remaining communication system, via an associated access point and to the central unit. The communication node 300 further includes a power supply or power handling unit 380, which provides electric power to operating the circuits included in the communication node 300.

The communication node 300 may, e.g., be arranged to implement a physical level protocol as defined by the specification known as IEEE 802.15.4.

Figure 4:
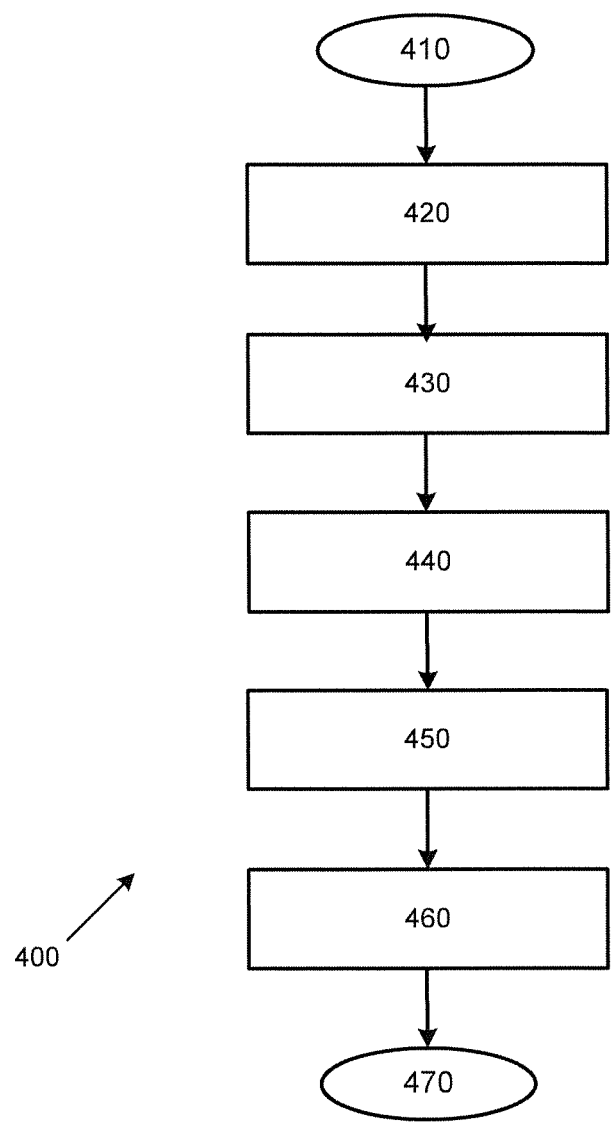
FIG. 4 is a schematic flow chart illustrating an operating method of a communication node.

FIG. 4 is a schematic flow chart illustrating an operating method of a communication node.

The illustrated method 400 may be implemented as a computer program, embodied as a set of processing instructions that may be contained in a memory (such as the non-volatile memory 320 mentioned with reference to FIG. 3 above) and executed by the processing device 340 in the communication node 300.

The method 400 is an operating method of a communication node in a wireless communication network, wherein the node 300 communicates with a central communication unit 150 via at least one access point 140.

The method starts at the initiating step 410.

First, in the receiving step 420, a wireless signal is received at the node 300 from the access point 140.

Further, in the channel quality determining step 430, channel quality information is determined, by the node 300, based on the received wireless signal.

Further, in the order determining step 440, an order of active channels ranked according to the determined channel quality is determined by the node 300.

Next, in the selecting step 450, an active channel for transmitting wireless signals in accordance with the determined order is selected, by the node.

Next, in the transmitting step 460, wireless signals are transmitted by the node on the selected, active channel, as selected in the selecting step 450.

The method may be repeated or terminated at the terminating step 470.

Advantageously, the wireless communication network is a beacon enabled carrier sense multiple access (CSMA) based network.

The transmitting step 460 of transmitting, by the node, wireless signals on the selected, active channel, may advantageously include transmitting a message using carrier sense multiple access/collision avoidance (CSMA/CA).

In an advantageous aspect, the method 400 performed by the node may further include a step of locking on beacon timing information that is provided by the receipt of beacon data from the access point.

In an advantageous aspect, the method further includes iterating, by the node, through the channels according to a timeslot pattern.

The illustrated method 400 may also include steps or elements provided or performed in conjunction with an access point 140. In an aspect, the method 400 may further comprise operating the access point 140 in a beacon transmit mode. In such a beacon transmit mode, the access point transmits wireless beacon data to the node 300. The access point may also be operated in a listening mode. In the listening mode, the access point relays data received from the node to the central communication unit 150.

In an advantageous aspect, the node 300 and the access point 140 may be synchronized by a common clock signal.

Further possible general aspects and associated advantages of the disclosed operating method appear from the following:

Aspect 1. Any number of time synchronized AP's may transmit beacon frames in dedicated timeslots according to their currently assigned channel. Any predetermined pattern can be used. Nodes may lock on to the beacon timing and continuously iterates through all channels according to the timeslot pattern. Benefit: A node will be aware of all AP's within range and receive beacons and contained data from all of them.

Aspect 2. In between its beacon transmissions an AP will be in listening-mode, relaying all incoming frames from nodes. A beacon frame may contain acknowledgements for frames received since the previous beacon as well as outgoing data. A node receiving data in a beacon may acknowledge this either in a dedicated acknowledge phase or through a normal data frame.

Aspect 3. Nodes may rank the active channels according to the received signal quality. When the node wishes to transmit, it may perform a CCA on the available channels sequentially according to the ranking. Once a free channel is found the transmission may be initiated, otherwise the node may perform a random delay before retrying. Benefit: Traffic will automatically distribute across the available AP's even if a large number of nodes are considering the same AP as their preferred one.

Aspect 4. When the central unit wishes to transmit a frame to a specific node, it can route the frame through any AP that is within range of the node. In the simplest case this may involve routing it through the AP where the unit last received a message from that node. The accuracy of this approach depends only on the frequency at which the nodes transmits messages compared to their speed relative to the AP's. Benefit: No need for routing algorithms as the nodes will maintain the route table in the central unit automatically simply by transmitting frames.

Aspect 5. If an AP for any reason wishes to move to another channel, the only action needed, except from physically changing the frequency, is to change its beacon timing accordingly. Any nodes within range will simply interpret this as if one AP got out of range while another came in, making the process completely seamless and invisible from both the central unit and the nodes. Benefit: Channel selection can be done with little to no throughput penalty, enabling the AP's to move away from noisy channels at a very small cost.

Aspect 6. The nodes perform energy measurements on all channels while listening for beacons. This data may be enumerated and appended to the transmitted frames, giving the AP's knowledge about each other and any alien transmitters within range. Benefit: The AP is able to intelligently select the optimal channel at its particular geographical location. This way interference, both regular and irregular, can be dynamically avoided, making the protocol extremely robust and also very un-invasive.

The disclosed operating method, the communication node, the communication system and the storage system, may be illustrated and described in further detail by reference to FIGS. 5, 6, 7 and 8 and their corresponding description below.

Unacknowledged Frames

In an aspect, direct acknowledgment may be skipped on messages being transmitted from the nodes 300 to the access points 140. Instead the acknowledgments could be included in the beacons in the form of a list of node addresses. This approach may significantly reduce the total overhead, with the downsides being larger beacons, a maximum delay between the frame and the acknowledgement equal to the beacon period, and that the nodes would not be able to transmit more frequently than the beacon frequency.

With an example requirement stating that the nodes will transmit at a maximum frequency of 7 Hz, any beacon frequency above this would mean that the nodes are able to transmit all the messages they want. Assuming that it would be feasible to have beacon frequencies of anywhere from 20 to 40 Hz would make the beacon period somewhere between 50 and 25 ms. With the requirements stating that the majority of the messages should be transmitted within 100 ms we see that having to wait for up to 50 ms for the acknowledge still puts us well within what we are able to accept.

Dedicated Acknowledge Phase

In an aspect, a period of time somewhere during the access phase following the beacons may be dedicated to acknowledgments from the nodes that had received a message in a preceding beacon. This ensures that the nodes are able to send their acknowledgments compared to if they were to use CSMA/CA. Under the 802.15.4 standard this may be done by assigning GTS'es to the nodes that received a message, wherein the node would transmit its acknowledge, and possibly also a message if it had one pending. The downside of this would be that the GTS'es are bound to be at the end of the beacon period, meaning that the acknowledgement will arrive at the latest possible time. Also the standard offers limited flexibility as to the size of the GTS'es, in essence the GTS'es would be way oversized for only a single acknowledge, resulting in wasted bandwidth. A possible solution to this would be to discard the 802.15.4 standard and make a proprietary solution with GTS'es immediately following the beacon.

Channel Agility

In an aspect, it may be desired to make the system more dynamic and self-managing with respect to channels, with the ultimate goal to have all channel handling hidden inside the protocol itself. A solution was proposed where all the channels would be assigned a unique time offset relative to some global timing reference. Each access point would transmit its beacons following the timing offset dedicated to its assigned channel.

Figure 5:
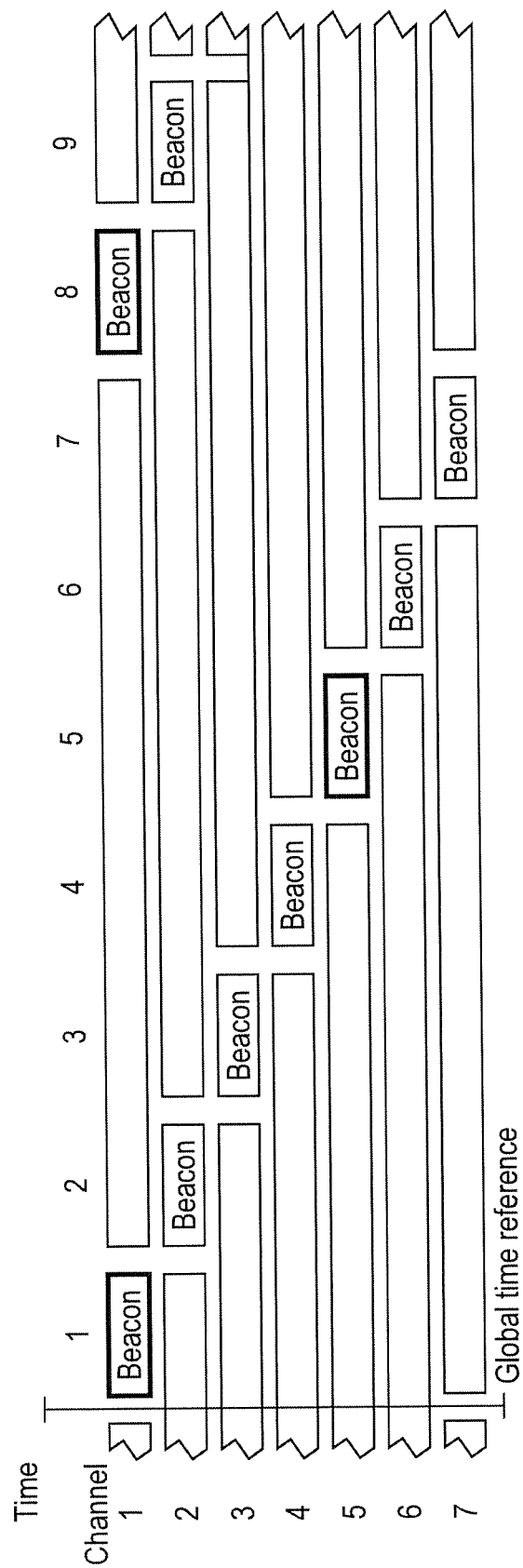
FIG. 5 is a schematic timing diagram, illustrating principles of a basic beacon sequence.

FIG. 5 is a schematic timing diagram, illustrating principles of a basic beacon sequence.

An idle node will, once synced to the sequence, cycle through all the channels, detecting beacons from all access points within range. A simple illustration of this is presented in the timing diagram 500 in FIG. 5, showing an example using seven channels and how their beacons are located sequentially in time. In this illustration channel 1 and 5 are active while the rest of the channels are unused, meaning that the nodes will listen, but not pick up any beacon, and thus not include the channel in its list of active channels. It is shown how the sequence wraps around when it reach channel 7, going back to channel 1. The introduction of a global time reference, which would make or break this approach, was possible, and convenient, because the existing protocol used in AutoStore already has such a reference, thus only minor adjustments are needed to reuse this functionality. The existing synchronization mechanism is in the form of a 130 Hz signal distributed to all the AP's from the central safety module in connection to the AP's POE supply. With the use of this approach the need for routing is reduced significantly. Nodes will automatically detect when an AP goes in or out of range, and adjust its list of available AP's accordingly. When a node wishes to send, it will put the channel cycling on hold and lock onto the channel that is best suited for transmission, here it will transmit its message using CSMA/CA and, if the attempts succeeds, wait for the following beacon containing the acknowledge. If the CCA fails the node is free to attempt access on another channel immediately if more than one channel is available. This way the traffic load will spread among the available AP's automatically.

When the server wishes to send a message to a node it will relay the message through the AP where it last received a message from that node. This makes the routing table for the server extremely simple and self managing.

The AP's can also change channels at will without having to inform the nodes or the server in advance, the node will simply assume that one AP got out of range while another came within range, making the system extremely flexible.

One of two pitfalls with this approach is that a node might be transmitting on one channel while it is receiving a message in a beacon on a different channel. This is bound to happen when a node crosses the boundaries between two AP's and thus change what it considers as its preferred transmission channel. Also the node can simply have moved out of range of the transmitting AP. In order to overcome this problem the most important thing is to move all retransmission responsibility to the server. This way an AP that does not receive an acknowledgement for a message will simply report back to the server that the message failed. It is then up to the server to retransmit the message, on the same or on a different AP. Using this approach each lost packet from this effect can be retransmitted on the correct channel almost immediately since the channel connected to the node in the server is in most cases updated in parallel to the first transmission failing. Also it can be reasoned that, since the number of messages going from the nodes to the server is a lot larger than the number of messages going the other way (1-7 per second vs. 0-1 per three seconds as stated in table 1.1), the node is very likely to transmit a message on the new channel before the server attempts to transmit a new message in the first place, thus making the event less likely to occur.

The second pitfall is that a node might be transmitting on a channel after the AP has moved to a different one. This could be avoided by having the AP append some information to the beacon that a channel swap is imminent, preventing the node from transmitting, or one can simply accept that the packet loss from this event will occur. Assuming a beacon period of 25-50 ms the node can safely retransmit the message in the next period and still be well within the 100 ms latency requirement. As such this artifact could be considered an acceptable sacrifice given the benefits the overall approach offers.

Sequence Numbers

In this scenario, as with all acknowledged communication, a seemingly failed transmission can either be caused by the original message not being transmitted correctly, or by the acknowledgement failing, making the transmission seem unsuccessful only from the senders' point of view. This is best handled by the use of sequence numbers, where the receiver checks if the message is a retransmission of a previous message or not. In this case, with the nodes moving between the AP's in the seamless manner presented in the previous section, it is clear that the AP's will not be able to know whether or not a message is a duplicate. This because any message it receives might have been attempted to be transmitted on a different channel before. A node can, theoretically, swap between two AP's for each transmitted packet. Because of this the sequence numbers are meaningless to include in the protocol and has to be added on a higher level by the server and the application running on the nodes. This creates the direct one to one link that is needed for sequence numbers to work.

Addressing

In table 1.1 it is stated that the system should be able to handle 250 independent nodes, a number implying that one byte addressing can be sufficient. However this requirement is largely related to the throughput, not the number of nodes supported by the system. As such it is highly desirable to enable addressing of more than 256 nodes. This will make sure the solution is future proof for possible extensions and changes at a later stage. The 802.15.4 standard use 16 bit addresses during normal communication, and can fall back to 64 bit addresses if needed, utilizing a full standard MAC address. Even if the need for 64 bit addresses will most likely never be of any interest in this case, 16 bits makes for a very reasonable number of nodes that should satisfy relevant system requirements.

TABLE 1.1

Numerical system requirements

| | |
|---|---|
| Maximum number of clients | 250 |
| Maximum number of routers | No limit |
| Packet size | Median 8 bytes |
| | Max (protocol limit) bytes |
| | Min 5 bytes |
| Packets/second/client | Median 1 |
| | Max 7 |
| Commands/second/client | Median 0 |
| | Max 0.33 |
| Minimum range | 30 m |
| Latency | 50% <100 ms |
| | 95% <300 ms |
| | 99% <500 ms |
| Power requirement | No limit |

Extended Checksum

Another possible consideration includes the need for a larger checksum than the normal 16 bits used in 802.15.4. The reasons for this are previous experiences with corrupted packets being accepted as genuine commands. Though only a 1/65534 chance, the amount of messages transmitted makes even such a small chance occur multiple times per year if the radio environment is noisy and suboptimal, and the consequences of such an event can be disastrous. It is unlikely that this problem will be as big with the new protocol as it was for a short period with this previous solution, but from that point on the choice was to be safe rather than sorry, meaning that the addition of an extra 16 bit checksum is considered a well worth overhead.

Network ID

In order for the channel cycling to work it may be useful that the nodes are not confused by alien beacons that can bring them out of the sequence timing. This can occur if two AutoStore installations are within radio range of each other. The AP's of the two installations will not be following the same global clock and will thus be out of sync with each other. A node searching for beacons could then be at risk of locking onto the sequence of the wrong warehouse. To overcome this problem a Network ID can be introduced. This will allow for the nodes to filter out the beacons that are not of any interest to them, and it will also allow the AP's to filter out any data frames from the neighboring network. Under normal running conditions neither event should generally happen since the AP's are to stay on different channels and, most likely, also out of sync, meaning that a synchronized node will not pick up any fake beacons and no alien node will transmit on a neighboring AP's channel. However the moment a node loose synchronization and has to search for beacons the conflict is imminent.

One challenge with this approach is how the nodes should associate with the network in the first place, as they are meant to communicate with the system purely through the radio. To overcome this one specific network id can be set as a "don't care" value where the node will sync to any network, this value will then be the default value used by the protocol. It is then up to the application to contact the server on that particular network, asking if they should associate. If this is not the case that network id could be added to a blacklist and the node forced to do a new beacon scan. When the correct network is found this network id should be stored in nonvolatile memory for future use, meaning that the association procedure only has to take place the very first time a node is added to a network.

Broadcasting

In addition to the normal operation of the system a special mode for broadcasting may be supported. This mode may be used to reprogram the nodes across the radio link. This involves the AP's broadcasting a large program file to all nodes, after verifying the file a boot loader takes care of loading it on the module. This mode can be completely separate from the normal operation as it will only be used when the system is in a stationary and idle condition. Also this mode is relatively straight forward as the nodes can, and should, lock onto one channel and receive the whole file from that AP. As such the implementation of this feature is not of any interest for this thesis, but it has to be taken into account when defining the protocol in order to get a unified system once the work is completed.

A fully proprietary solution may be appropriate, as this will benefit greatly from being built from scratch without having to adjust to existing standards, also the system is not necessarily supposed to communicate with any other system or module, in fact it is desired to make such an event as difficult as possible to avoid errors. The use of 802.15.4 given the strategy described earlier is possible, but the resulting protocol will not necessarily be optimal, and many of the features that 802.15.4 offers are not necessarily needed and may add unnecessary overhead. In order to maximize the efficiency of the protocol a fully proprietary solution at MAC-level may be used together with the PHY-level described in 802.15.4. This may be done based on the fact that the majority of radio SoC's support 802.15.4 and are built upon the physical description in this standard. However the functionality on the MAC level is in many cases done partly in software, meaning that the developer can easily deviate from the standard when desired.

Radio Module

The radio hardware may include a Dresden Elektronik deRFmega128-22C02. This module encapsulates an AtMega128RFA1 chip and includes RF shielding, onboard EEPROM, onboard crystal oscillators and onboard coaxial antenna connector. Virtually all pins of the atmega is accessible on the outside making the chip a plug and play hardware solution while still allowing the maximum flexibility. This module is mounted on a custom radio module. This chip also contains another microcontroller handling the TCP/IP communication on the AP and the communication with the rest of the hardware on the vehicle in the storage system.

AtMega128RFA1

The AtMega128RFA1 is a complete system on chip containing a powerful microprocessor with direct access to the radio module. The radio module has an easy to use interface with control and data registers accessible directly from software. It also has several dedicated interrupts indicating all important radio events.

Transceiver

The transceiver implements the IEEE 802.15.4 physical layer modulation scheme, channel structure, physical preamble, checksum calculation and CCA. Also energy detection and link quality indication is available in hardware. On the MAC level there are dedicated modes for automated acknowledgments, CSMA/CA transmissions and retransmissions according to the standard, and automated address filtering. Other hardware accelerators include AES 128 bit cryptography, true random number generator and PSDU rates higher than that supported in the 802.15.4 standard. Both 500 kb/s, 1 Mb/s and 2 Mb/s are supported.

In total the chip allows easy implementation of any protocol built directly upon the 802.15.4 standard, but the transceiver is controllable at a level that allows the user to deviate from the standard when needed. Among others the SFD is accessible through a dedicated register allowing the radio to differentiate its frames from 802.15.4 frames on the lowest possible "pre modulation" level.

Mac Symbol Counter 802.15.4 implies the use of a symbol counter to maintain the timing of the protocol, this counter should be able to wake up the transceiver before the planned reception of a frame, and it enables accurate execution of the GTS slots and CSMA/CA backoff slots as stated in the standard. In atmega128RFA1 this counter contains three independent comparators, as well as a dedicated backoff slot counter and the possibility of automated beacon timestamping when using 802.15.4 compliant frames.

RSSI and Energy Detection

When in any receiving mode the chip will continuously update a register with the current RSSI. This is a measurement of the current energy level on the channel, regardless of whether the signal is decodable or not. This value can then be read directly or the more accurate energy detection register can be used instead. The energy detection is hardware driven and calculates the average RSSI over eight symbols. The completion of this procedure is then signaled by an interrupt. In addition to the manual energy detection it is always initiated automatically upon the reception of a valid SHR, meaning that once a frame has been fully received the ED register will contain an indication of the physical signal strength that was received.

Final Protocol Concept

Following the requirements and discussions presented earlier, a list of possibly desired features for the protocol to satisfy is presented:

Beacons transmitted at a set frequency, with a time offset between the channels equal to the length of one such beacon.

A global time reference for all AP's, and subsequently, nodes, to synchronize to.

Nodes scanning all channels, receiving all beacons unless it is busy transmitting.

Data frames transmitted using CSMA/CA in the access window of the beacon period.

Failed CCA on one channel leads to the node attempting to access other available channels.

Acknowledgments for data frames sent as a list of node addresses in the following beacon.

A dedicated acknowledge phase immediately following each beacon, used by the nodes that received a message.

No retransmissions on protocol level, all failed transmissions are reported back to the application.

Measurement of channel quality and change of channels when needed. All concealed within the protocol.

Broadcast mode allowing AP's to transfer larger files to all connected nodes.

16 bit addressing of nodes, AP's only identified by their channel.

Network ID allowing multiple installations within close proximity.

A total of 32 bit checksum.

Specialized frame headers to minimize overhead.

Figure 6:
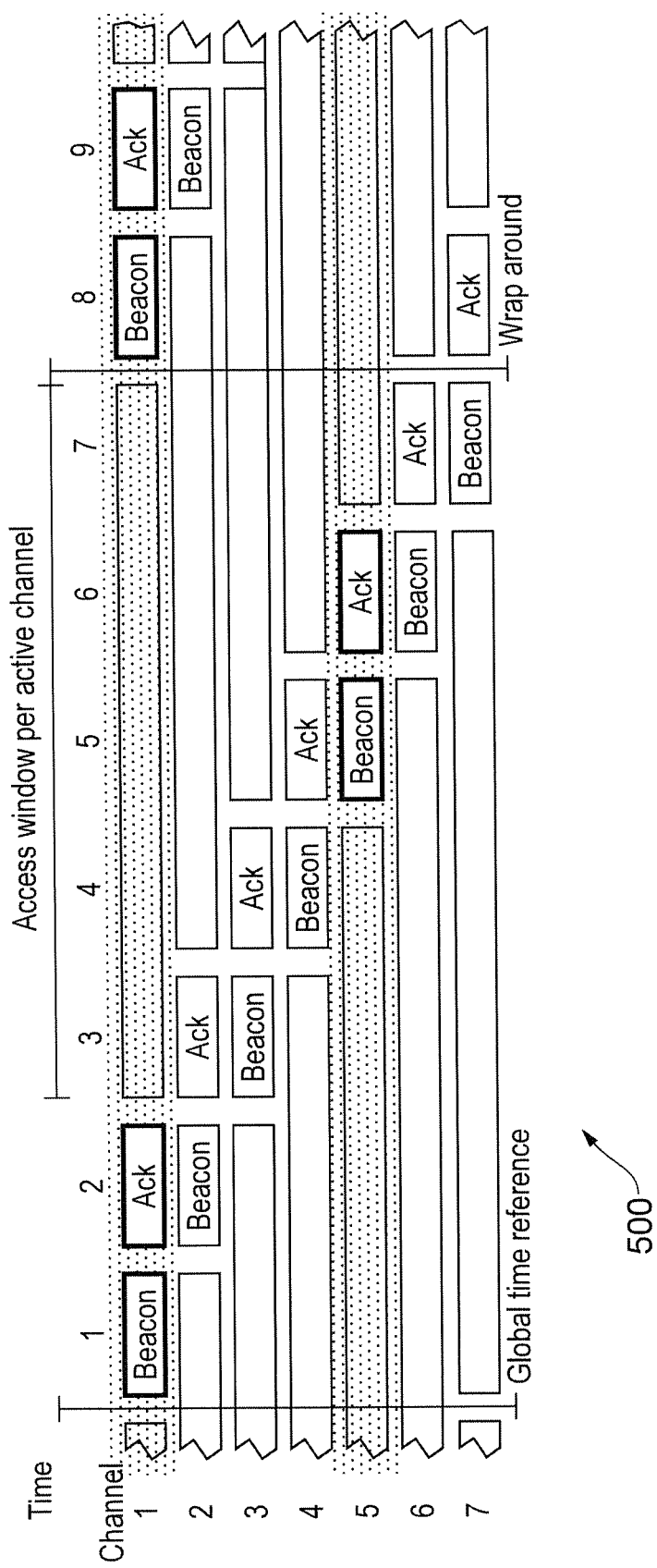
FIG. 6 is a schematic timing diagram, illustrating principles of time offset between channels.

Based on this list of features a modified version of the beacon sequence from FIG. 5 is shown in FIG. 6, which includes a schematic timing diagram 600, illustrating principles of time offset between channels.

The addition of a dedicated acknowledge phase will shrink the data phase slightly, but given that the acknowledgments would otherwise be transmitted within the access window, this will have no effect at all on the overall throughput. The total access window for each active channel will be equal to the number of available channels, minus two, multiplied with the length of one subperiod. Under normal circumstances the 802.15.4 physical definition uses 16 channels in the 2.4 GHz band. This means that the channel is available for transmissions $14/16$ of the time, while the last $2/16$ are occupied by the beacon and the acknowledge phase.

Since the beacons should follow a strict timing it is essential that they are always transmitting-when they are supposed to, this means that there is no use in doing a CCA prior to this transmission. This lack of collision avoidance measures may in some aspects cause problems for other networks in the area, Wi-Fi etc, but given the total available bandwidth in the 2.4 GHz band it is a reasonable assumption that the protocol will be able to find channels that are not shared with other systems. This way the direct transmission should not pose any problems. In the event that there is a collision the worst case scenario for this protocol is that the nodes are unable to decode the beacon, leading them to believe that the AP has gotten out of range. This can trigger packet loss. Still this event, so long as it does not happen too frequently, will only cause a temporal decrease in throughput. In order to maximize the efficiency of the acknowledge phase it is also desired to split it into dedicated slots where the nodes transmit their acknowledge frames directly. How many slots we need depends on how many messages we fit into one beacon and is further discussed later.

Final Protocol Definition

In an implementation that deviates from the 802.15.4 standard, custom headers and frame structures have to be defined.

Frame Header

The protocol may utilize four different frame types, summarized in table 2.1:

TABLE 2.1

Frame descriptions.

| Frame | Sender | Receiver | Timing |
|---|---|---|---|
| Beacon | AP | Node | At regular intervals, time offset based on channel number enable nodes to receive beacons on all available channels. |
| Acknowledge | Node | AP | A node that receives a command in a beacon frame will transmit an acknowledge frame within a dedicated timeslot immediately following the beacon frame. |
| Data | Node | AP | Nodes transmit data frames outside the beacon/acknowledge window using CS-MA/CA. The node will attempt to transmit on the perceived best channel. Acknowledge for the frame is received in the following beacon on the same channel. |
| Broadcast | Both | Both | Used in broadcast mode, not elaborated further in this thesis. |

Four different frame types can be represented using a two bit field in the header. It seems unlikely that more frame types will be needed as the types used are quite general and will most likely be reusable in most future scenarios.

The next field in the header should be the network id. It is very unlikely that more than two or three independent installations are within range of each other. However with very large installations it will be increasingly practical to split it into multiple physical grids, thus a scenario where a single installation consists of multiple independent grids is highly likely. In such a case one can imagine that 2-6, or even more, grids are within range of each other, even if they in reality are part of the same overall installation. Some network ID's should also be reserved for special purposes, among them a "don't care" value that is accepted by all listeners. In total it is not unlikely that there might be a need for more than 8 different ID's, meaning that four bits, giving 16 different ID's should be the preferred choice.

In total that makes a 6 bit header, in order to make it a full byte two extra bits are added at the end. These bits are then available for future extensions or frame specific features. For instance in connection to the channel management feature. The full header is seen in table 2.2:

TABLE 2.2

Frame header definition.

| Bit: | 7-6 | 5-2 | 1-0 |
|---|---|---|---|
| Contents: | Type | ID | Reserved |

Frame Layout

The example chip atmega128RFA1 supports hardware driven checksum generation and verification according to the 802.15.4 standard. Also it requires the first byte in the frame buffer during transmission to be the PHR, also defined in 802.15.5. This byte consists of the frame length and a bit to indicate if the frame complies with the 802.15.4 standard or not. The frame buffer is a total of 128 byte long giving us a frame layout as seen in table 2.3. The available payload for a general frame is then a maximum of 122 bytes when checksums and other overhead are subtracted. How big the effective payload is depends on what extra overhead the different frame types introduce and are more thoroughly defined in the following.

TABLE 2.3

Full frame layout, values in parenthesis are invisible to the software during transmission and reception.

| Bytes: | (4) | (1) | 1 | 1 | 1-122 | 2 | 2 |
|---|---|---|---|---|---|---|---|
| Contents: | (Preamble) | (SFD) | PHR | Header | Payload | Checksum | FCS |

Data Frame

The data frame is sent by the nodes to the AP's using CSMA/CA in the access window, since only one AP will listen on the given channel it does not need any target address, but it must include the ID of the transmitting node. Also the number of data bytes is appended before the list of data begins. In total this gives the layout seen in Table 2.4, and as is seen here this allows for an effective payload of 119 bytes.

TABLE 2.4

Full data frame layout.

| Bytes: | 1 | 1 | 2 | 1 | 1-119 | 2 | 2 |
|---|---|---|---|---|---|---|---|
| Contents: | PHR | Header | Node ID | Data length | Payload | Checksum | FCS |

Acknowledge Frame

The acknowledge frame may be sent by the node in a dedicated slot during the acknowledge phase. It is transmitted directly without any sensing of the channel in order to maintain strict timing. This frame only needs to contain the ID of the transmitting node, as this is all the AP needs to confirm that the message addressed to that particular node was received successfully. In order to keep the frame as small as possible the extra checksum is skipped, leaving only the 16 bit hardware driven checksum. This can be done since the corruption of this frame is completely uncritical compared to the beacons and data frames. The AP will only look for the node ID's that it did in fact address in the previous beacon, meaning that a corrupted frame with a random ID is unlikely to be accepted by the AP even if the checksums happens to be correct. Thus the node ID itself effectively acts as a checksum. In total this gives the frame layout shown in table 2.5.

TABLE 2.5

Full ack frame layout.

| Bytes: | 1 | 1 | 2 | 2 |
|---|---|---|---|---|
| Contents: | PHR | Header | Node ID | FCS |

Beacon Frame

The beacon may contain a list of acknowledgments for the data frames received in the previous access window, and a varying number of messages addressed to different nodes. In order to optimize the functionality of the protocol the most reasonable approach may be to first add the list of acknowledgments, and then append as many messages as there are room for. This means that in high traffic situations the "AP to node"-throughput is the first to suffer, that will lead to the nodes not receiving commands as frequent as they should, which again will lead to the nodes going idle more frequent, thus generating less traffic "node to AP". This way the traffic flow is self regulating.

In order for the nodes to interpret the beacon correctly with a varying number of entries a beacon header is needed. This should contain the number of acknowledgments in the list and the number of following messages. This will also make it easy for nodes not expecting an acknowledgement to jump straight to the message list.

TABLE 2.6

Beacon header definition.

| Bit: | 7 | 6-2 | 1-0 |
|---|---|---|---|
| Contents: | Reserved | Ack number (0-31) | Message number (0-3) |

TABLE 2.7

Full beacon frame layout.

| Bytes: | 1 | 2 | a * 2 | $\Sigma_{0-m}^{i}(3+k_i)$ | 2 | 2 |
|---|---|---|---|---|---|---|
| Contents: | PHR | Headers | Ack list | Messages | Checksum | FCS |

TABLE 2.8

Total timing overhead to be subtracted from beacon period.

| Phase | CH swap | Timing buffer | Overhead | Interpretation | Sum |
|---|---|---|---|---|---|
| Time | >33 µs | 160 µs | 384 µs | X (160) µs | 737 µs |
| Symbols | 3 | 10 | 24 | X (10) | 47 |

Acknowledge List

The longer the access window is, the more data frames is likely to be transmitted, and the more acknowledgments has to fit into the beacon. In table 2.9 the absolute maximum theoretical number of messages per access window is calculated assuming all transmitted messages contains 8 bytes payload. However this number is highly theoretical due to the random nature of CSMA/CA. Still it can be used as an indicator when dimensioning the fields. We see that, at a beacon frequency of 30 Hz, the maximum theoretical number of data frames are 33 and at 25 Hz the number increase to 40 frames.

TABLE 2.9

Timing and beacon calculations at different beacon frequencies.

| Freq | Subperiod size | Max beacon size (bytes) | Effective beacon size | Access window size | Max number of messages |
|---|---|---|---|---|---|
| 15 | 260 | 130 | 106 | 3640 | 67 |
| 18 | 217 | 108 | 84 | 3038 | 56 |
| 20 | 195 | 97 | 73 | 2730 | 50 |
| 22 | 177 | 88 | 64 | 2478 | 45 |
| 24 | 162 | 81 | 57 | 2268 | 42 |
| 25 | 156 | 78 | 54 | 2184 | 40 |
| 26 | 150 | 75 | 51 | 2100 | 38 |
| 27 | 144 | 72 | 48 | 2016 | 37 |
| 28 | 139 | 69 | 45 | 1946 | 36 |
| 29 | 134 | 67 | 43 | 1876 | 34 |
| 30 | 130 | 65 | 41 | 1820 | 33 |
| 31 | 126 | 63 | 39 | 1764 | 32 |
| 32 | 122 | 61 | 37 | 1708 | 31 |
| 33 | 118 | 59 | 35 | 1652 | 30 |
| 34 | 114 | 57 | 33 | 1596 | 29 |
| 35 | 111 | 55 | 31 | 1554 | 28 |
| 36 | 108 | 54 | 30 | 1512 | 28 |
| 38 | 102 | 51 | 27 | 1428 | 26 |
| 40 | 97 | 48 | 24 | 1358 | 25 |

Another factor is the maximum size of the beacon. With each acknowledge taking up two bytes, a list of 32 acknowledgments will take up 64 bytes. From table 2.9 the number of symbols available for the whole beacon phase can be found, and taking into consideration that a significant portion of these symbols will be used for overhead and synchronization between the nodes and the AP it can be assumed that the beacon frequency must be far below 30 Hz for it to be able to fit more than 64 bytes or actual data.

Based on this it is clear that a maximum of 32 acknowledgments, requiring five bits to indicate the list length, should be sufficient under any realistic circumstances.

Message List

The maximum number of messages has to be evaluated in a similar manner as the number of acknowledgments. Here two matters have to be considered. Firstly the acknowledge phase has to be able to fit a number of acknowledgments equal to the maximum allowed number of messages. As stated in table 2.5 one acknowledge frame contains five bytes of data in addition to the physical header consisting of another five bytes as shown in table 2.3. In total this means that an acknowledge frame needs 20 symbols to fully transmit, in addition to this the acknowledge slots has to allow some drift, meaning that a minimum of 25 symbols should be used as a basis for any calculations. As seen in table 2.9 each subperiod will be 130 symbols long with 30 Hz beacon frequency. This can allow up to five acknowledgments.

Secondly the maximum number of messages has to fit in the beacon frame. Each message will be represented by the node ID, a parameter stating the amount of data, and the data itself. Using the requirements stated in table 1.1, with average message size of 8 bytes, this means 11 bytes per message. In addition to this the requirements states that the ratio between incoming and outgoing messages from the AP's will be somewhere between 3/1 and 21/1. Meaning that each outgoing message can be assumed to be accompanied by at least three acknowledges for incoming messages. In total this means that one outgoing message from the AP can be assumed to take up an average of at least 17 bytes in the beacon, and in many cases a lot more because of a much higher number of acknowledgments.

Based on the two limitations mentioned above the message list is set to a maximum of three, making the list length possible to code with only two bits. This gives the beacon header one additional reserved bit that can be used at a later stage.

Message Uniqueness

The way the protocol is designed there is nothing preventing an AP from adding multiple messages addressed to the same node to a single beacon. However that would require both the node and the AP to be able to handle the acknowledgment of all the said messages, adding unwanted complexity. The need for multiple simultaneous transmissions should never occur in the use cases the protocol is made for, and generally it is assumed that the application will concatenate the messages before adding them to the buffer, as this will save a reasonable amount of overhead. As such a simple rule is added to the protocol definitions, no beacon shall contain more than one message per node, and any broadcast message should be the only message within its beacon. This limit implies that the AP has to filter the messages to prevent any collisions, but the node will never have to wake up for more than one acknowledgement transmission.

Full Beacon Header

The final beacon header can be seen in table 2.6. The full beacon frame can be seen in table 2.7. Here the variable a indicates the number of acknowledgments added, m the number of messages and $k_i$ the number of data bytes contained in message i. The sum $$(a*2)+(\Sigma_{0-m}^{i}(3+k_i))+7$$

cannot grow larger than the maximum beacon size for the current beacon frequency. This maximum beacon size is further discussed below.

Beacon Size

The beacon frame is limited in size by the beacon frequency. In table 2.9 the symbol length of a beacon period at different frequencies can be seen. The calculations are based on 62500 802.15.4-symbols per second. One such symbol make out four bits meaning that one byte requires two symbols.

Channel Swap

Figure 7:
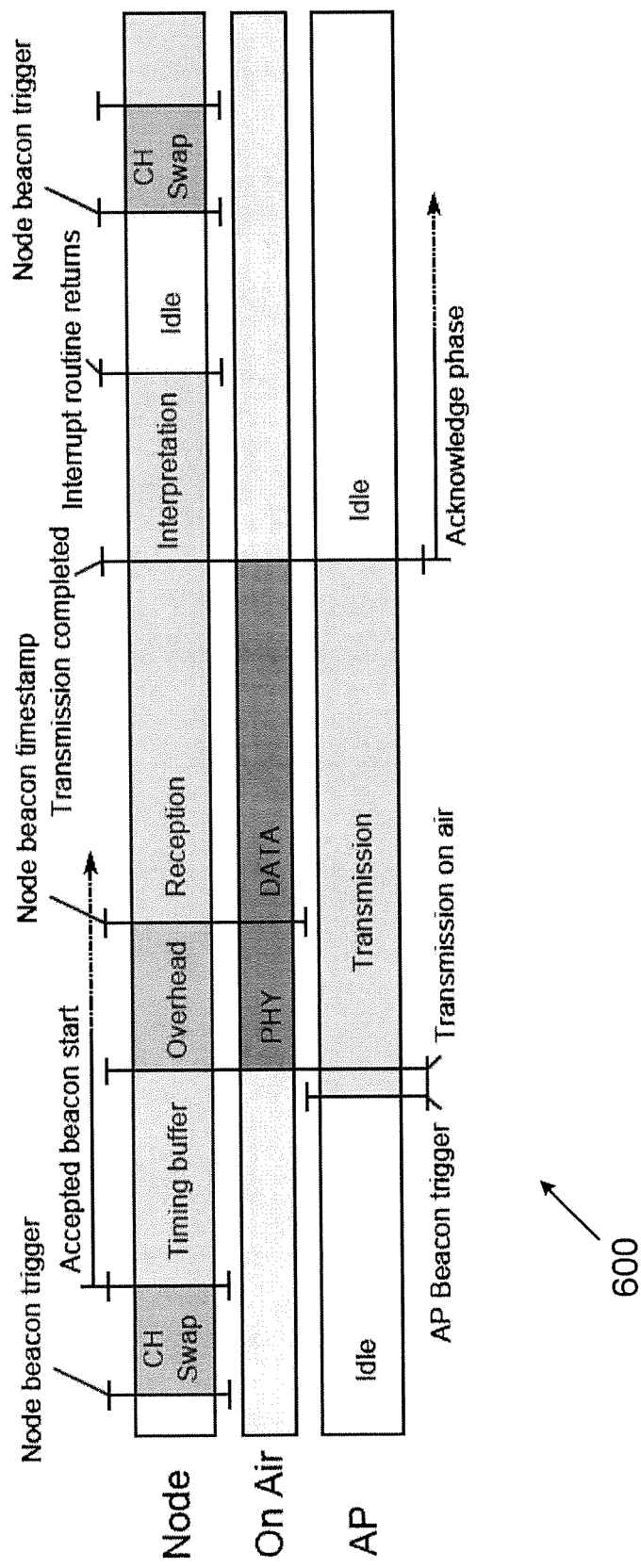
FIG. 7 is a schematic timing diagram, illustrating principles of phases of beacon transmission.

FIG. 7 is a schematic timing diagram, illustrating principles of phases of beacon transmission.

In FIG. 7 a rough sketch of a beacon transmission and the connected phases are shown. In order for the node to be prepared to receive a beacon it has to adjust to the new channel before the AP starts its transmission. The time this takes has to be subtracted from the time available for beacon transmission.

The time needed for the transceiver to settle on a new channel may be a maximum of 24 μs. The delay on interrupts are stated to be a maximum of 91 μs. Since the channel swap on the node is initiated as an interrupt it can be estimated that the total time needed is 9+24 μs+the computation time needed to initiate the swap. With a symbol length of 16 μp is this equates to minimum 2.1 symbols. Rounding this up to 3 symbols would then be reasonable.

AP Drift

Secondly there has to be room for some timing drift between the AP's, it cannot be assumed that the AP's are perfectly synced, down to a single symbol, at all times. With a timing buffer in place two AP's can drift as far apart as the size of the buffer without causing any problems. If they drift further apart the AP that triggers too early risk triggering before the nodes has adjusted to the channel, thus the nodes will not be able to receive the beacon, and subsequently no nodes will transmit on that channel since they assume that the AP has gotten out of range or gone offline. The size of this buffer depends solely on the accuracy of the AP synchronization, meaning that it is very hard to estimate beforehand. A buffer of length 10 will allow the AP's to deviate 5 symbols in any direction from the correct timing, or 80 μs. If the synchronization can be made far better than this the value can be adjusted down at a later stage to allow bigger beacons.

Interpretation

Lastly the node has to be able to complete its interpretation of the beacon before the next beacon trigger, or else the beacon trigger will be delayed and the node risks getting out of sync, with disconnects as the result. The length of this period will be hard to estimate theoretically, and the best way is most likely to set up a "worst case" test procedure and find the tipping point at which it starts failing.

Overhead

Once the part that does not include on air transmission is subtracted the actual overhead can be evaluated. As seen in table 2.3 a general frame has 11 bytes of overhead. Adding the beacon header makes it 12 bytes, or 24 symbols.

Note that not all this overhead is located in front of the frame, as it also includes the checksum and FCS at the end. When dimensioning timing variables and constants in the program itself this has to be taken into account.

Resulting Size

In table 2.8 the timing overhead surrounding each beacon is summarized according to the phases in FIG. 2.3. The time needed for interpretation is set to ten initially and should be tested later to find the optimal value.

Checksum

The custom checksum does not need to have error correcting abilities as most corrupted frames will typically have a large degree of corruption. Therefore a simple XOR of all the bytes in the frame is used. With two bytes checksum the first is the XOR of all odd indexed bytes while the second is the XOR of all even indexed bytes. In the event that a frame contains only one byte of payload the second byte should hold its initial value, zero. Note that the PHR is not included in the checksum as this byte is not inserted into the frame buffer when a frame is received. As such the first byte to be included in the checksum is the custom frame header.

Synchronization

A global timing reference may be introduced to maintain the strict timing requirement between the access points. The frequency of this signal must not exceed the beacon frequency. As such the existing 130 Hz is unusable. For simplicity it may be defined that the synchronization signal should be 1 Hz.

Functional Description

In FIG. 8 four examples of the communication sequence are shown. The four examples 8(a), 8(b), 8(c) and 8(d) are illustrations of transmission and reception for a node.

In FIG. 8(a) a simple reception is shown. The node receives a message within the beacon on channel five and stays locked to that channel throughout the following acknowledge phase to transmit its acknowledge.

In FIG. 8(b) the node attempts to access channel one for transmission and immediately gains access. As seen the node is not able to receive the beacon on channel five, as it is transmitting on channel one at that time. This will only pose a problem if the received beacon on channel five contains a message for the node, or a broadcast. However, as discussed earlier, the chance of the node losing a directly addressed message this way is sufficiently small for it to be an acceptable penalty.

In FIG. 8(c) the node fails its CCA on channel one, and at that point in time channel five is blocked by the beacon and acknowledge phase. Following this the node performs a random timeout and retries its transmission at a later stage.

In FIG. 8(d) the node has changed the ranking of the channels and attempts to transmit on channel 5 first, this fails, but since channel one is currently available it immediately retries there, with success. Note that just like in FIG. 8(b) this cause the node to miss the beacon on channel 5.

The invention has been described in the present disclosure by specific examples. The scope of the invention is defined by the appended claims.

The invention claimed is:

1. An operating method of a communication node in a wireless communication network, wherein the communication node communicates with a central communication unit via at least one access point, the operating method comprising:
   receiving, at the communication node, a wireless signal from the at least one access point;
   determining, by the communication node, channel quality information based on the received wireless signal;
   determining, by the communication node, an order of active channels ranked according to the determined channel quality;
   selecting, by the communication node, an active channel for transmitting wireless signals in accordance with the determined order,
   transmitting, by the communication node, wireless signals on the selected active channel, and
   sending, by the central communication unit, a message to the communication node only through an access point which last received the transmitted wireless signals from the communication node without routing algorithms, when there are at least two access points within the range of the communication node;
   wherein an association varies between the communication node and the at least one access point as the communication node crosses boundaries of the at least one access point,
   wherein the method further comprises locking, by the communication node, on beacon timing information provided by beacon data received from the at least one access point, and wherein the communication node continuously iterates through all channels according to a timeslot pattern.

2. The operating method according to claim 1, wherein the wireless communication network is a beacon enabled carrier sense multiple access based network.

3. The operating method according to claim 2, wherein the transmitting, by the communication node, the wireless signals on the selected active channel includes transmitting a using carrier sense multiple access/collision avoidance.

4. The operating method according to claim 1, further comprising iterating, by the communication node, through the active channels according to a timeslot pattern.

5. The operating method according to claim 1, further comprising operating the at least one access point in a beacon transmit mode, wherein the at least one access point transmits wireless beacon data to the communication node, and in a listening mode, wherein the at least one access point relays data received from the communication node to the central communication unit.

6. The operating method according to claim 5, wherein the communication node and the at least one access point are synchronized by a common clock signal.

7. A communication node operating in a wireless communication network, the network comprising the communication node, a central communication unit, and at least one access point, the communication node comprising:
   a memory;
   a processor and configured to:
   receive a wireless signal from the at least one access point;
   determine channel quality information based on the received wireless signal;
   determine an order of active channels ranked according to the determined channel quality;
   select an active channel for transmitting wireless signals in accordance with the determined order, and
   transmit, by the communication node, wireless signals on the selected active channel,
   wherein the central communication unit sends a message to the communication node only through an access point which last received the transmitted wireless signals from the communication node without routing algorithms, when there are at least two access points within the range of the communication node, and
   wherein an association varies between the communication node and the at least one access point as the communication node crosses boundaries of the at least one access point,
   wherein the communication node locks on beacon timing information provided by beacon data received from the at least one access point and continuously iterates through all channels according to a timeslot pattern.

8. The communication node according to claim 7, wherein the wireless communication network is a beacon enabled carrier sense multiple access based network.

9. The communication node according to claim 8, further configured to, in the step of transmitting wireless signals on the selected active channel, transmit a message using carrier sense multiple access/collision avoidance.

10. The communication node according to claim 7, further configured to iterate through the active channels according to a timeslot pattern.

11. The communication node according to claim 7, wherein the at least one access point is configured to operate in a beacon transmit mode, the at least one access point configured to transmit wireless beacon data to the communication node, and in a listening mode, the at least one access point configured to relay data received from the communication node to the central communication unit.

12. The communication node according to claim 11, wherein the communication node and the at least one access point are synchronized by a common clock signal.

13. A wireless communication system, comprising a central communication unit, at least one access point, and at least one communication node as set forth in claim 7.

14. A storage system, comprising:
- a three-dimensional storage grid structure containing a plurality of bins stacked in vertical stacks;
- supporting rails on the grid structure; and
- a plurality of vehicles, arranged to move along the rails on the grid structure;
  - each vehicle being configured to communicate with the central communication unit via the at least one access point, each vehicle comprising the communication node as set forth in claim 7.

* * * * *